United States Patent
Chang

(10) Patent No.: US 7,796,881 B2
(45) Date of Patent: Sep. 14, 2010

(54) CAMERA MODULE

(75) Inventor: Jen-Tsorng Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 101 days.

(21) Appl. No.: 12/171,517

(22) Filed: Jul. 11, 2008

(65) Prior Publication Data
US 2009/0097841 A1   Apr. 16, 2009

(51) Int. Cl.
*G03B 17/00* (2006.01)
*H04N 5/225* (2006.01)
*G02B 7/02* (2006.01)

(52) U.S. Cl. .................. 396/533; 348/340; 359/829

(58) Field of Classification Search .......... 396/529, 396/533; 359/819, 826, 829; 348/340
See application file for complete search history.

(56) References Cited

U.S. PATENT DOCUMENTS 6,307,678 B2   10/2001 Kosaka et al.
6,914,635 B2    7/2005 Ostergard
2008/0247748 A1 * 10/2008 Tanimura et al. ............ 396/502

FOREIGN PATENT DOCUMENTS

CN   1813212   8/2006
CN   1982932   6/2007

* cited by examiner

*Primary Examiner*—Rochelle-Ann J Blackman
(74) *Attorney, Agent, or Firm*—Andrew C. Cheng

(57) ABSTRACT

A camera module (100), includes a lens holder (120), a lens barrel (110) threaded in the lens holder, a lens (112) received in the lens barrel, and a plurality of resilient elements (148) connecting the lens with the lens barrel. The camera module further includes a plurality of shape memory alloy elements (142) with a preset shape. Each of the shape memory alloy elements includes two ends, one end attached to the lens, and the other attached to the lens holder. The shape memory alloy elements and the resilient elements cooperatively move the lens relative to the lens holder.

20 Claims, 4 Drawing Sheets

CAMERA MODULE

CROSS REFERENCE TO RELATED APPLICATION

This application is related to commonly-assigned copending application Ser. No. 11/400,885, entitled "ZOOM CAMERA". Disclosures of the above-identified application are incorporated herein by reference.

BACKGROUND

1. Technical Field

The present invention relates to camera modules, and particularly to a camera module with an autofocus mechanism.

2. Description of Related Art

In recent years, camera modules have been incorporated into mobile devices, such as mobile phones and laptop computers. Most such devices are progressively becoming smaller over time, and digital camera modules are, experiencing a corresponding reduction in size. Nevertheless, in spite of the small size of current digital camera modules, there remains a high demand for useful properties of the camera modules, such as autofocus function.

A camera module generally includes a lens module and an image sensor module in alignment with the lens module. The lens module typically includes a lens barrel and lenses assembled therein. Recently, camera modules have employed autofocus mechanism, such as step motors for driving the lenses by screws to move responsive to the image sensor module, thereby achieving the autofocus function. However, the total length required for such camera module is incompatible with most current size reduction requirements for the camera module.

What is needed, therefore, is a camera module which has a simple and compact autofocus mechanism.

SUMMARY

In a present embodiment, a camera module includes a lens holder, a lens barrel threaded in the lens holder, a lens received in the lens barrel, and a plurality of resilient elements connecting the lens with the lens barrel. The camera module further includes a plurality of shape memory alloy elements with a preset shape. Each of the shape memory alloy elements includes two ends, one attached to the lens and the other attached to the lens holder. The shape memory alloy elements and the resilient elements cooperatively move the lens relative to the lens holder.

Other advantages and novel features of the present invention will become more apparent from the following detailed description of preferred embodiment when taken in conjunction with the accompanying drawings.

BRIEF DESCRIPTION OF THE DRAWINGS

Many aspects of the camera module can be better understood with reference to the following drawings. The components in the drawing are not necessarily drawn to scale, the emphasis instead being placed upon clearly illustrating the principles of the present lens module. Moreover, in the drawings, like reference numerals designate corresponding parts throughout the several views.

DETAILED DESCRIPTION OF THE PREFERRED EMBODIMENTS

Embodiments of the present lens module will now be described in detail and with reference to the drawings.

Figure 1:
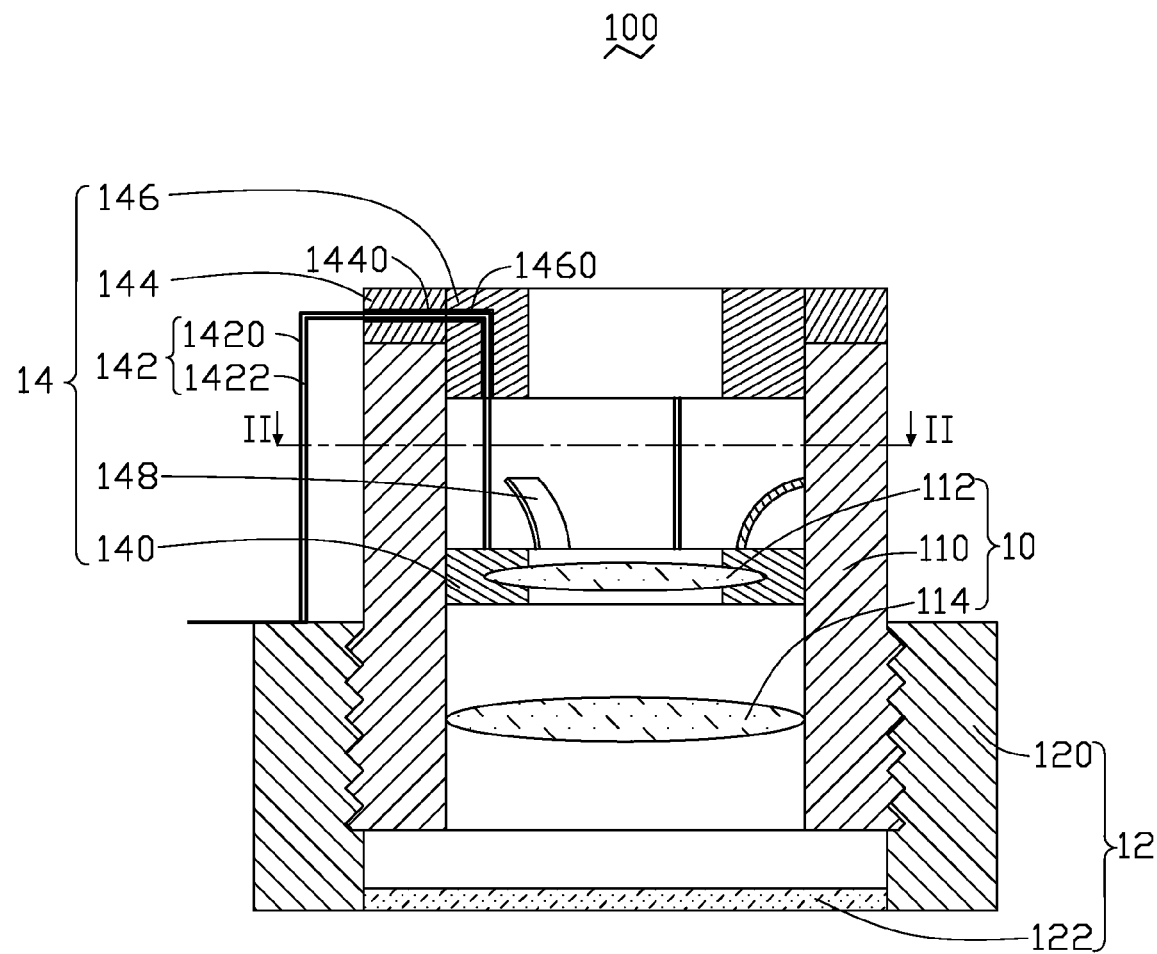
FIG. 1 is a cross-section of a camera module according to a first embodiment of the present invention.
Figure 2:
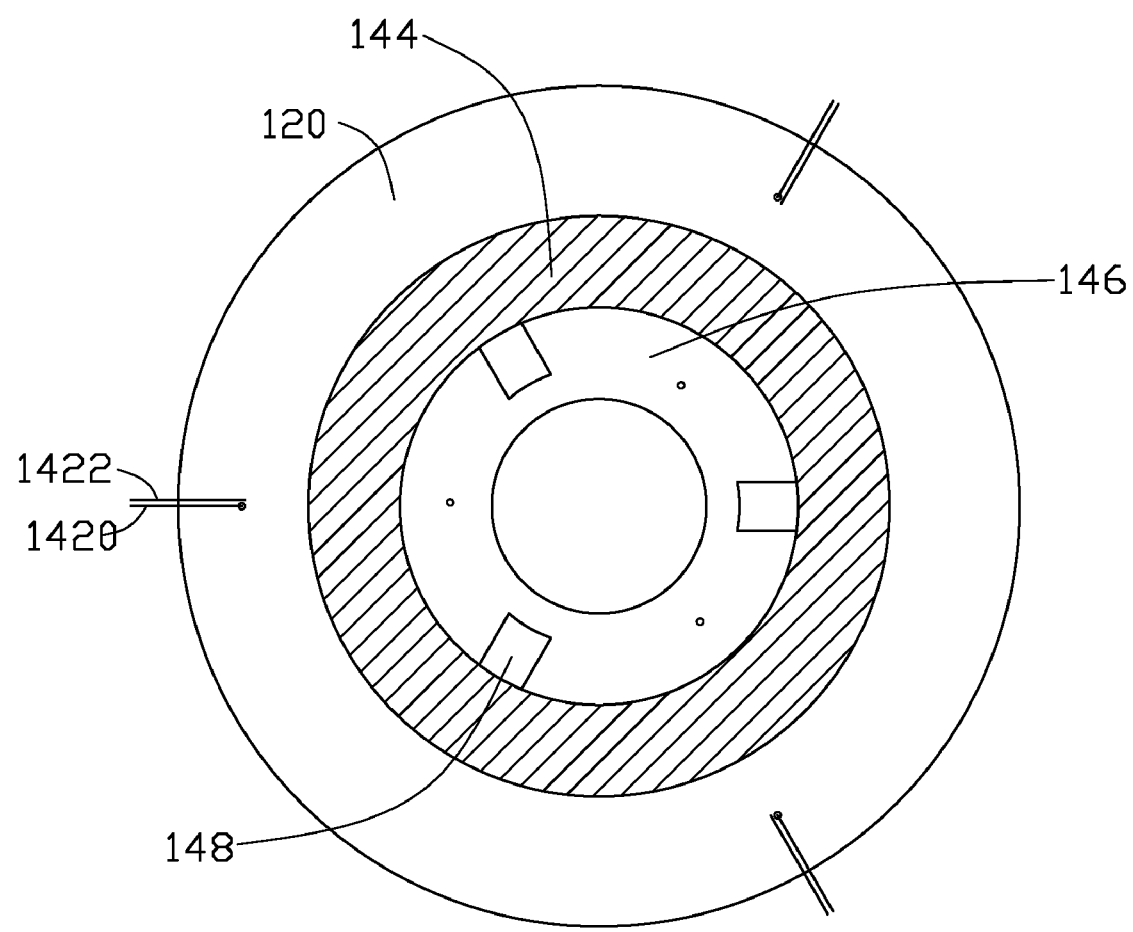
FIG. 2 is a cross-section taken along line II-II of FIG. 1.

Referring to FIGS. 1 and 2, an exemplary camera module 100 according to a first embodiment includes a lens module 10, an image sensor module 12 detecting light from the lens module 10, and a driving module 14.

The lens module 10 includes a lens barrel 110 and at least one lens. In the illustrated embodiment, the lens module 10 includes a first lens 112 and a second lens 114. It is to be understood that lenses of other suitable number and type known in the art can be used in the lens barrel 110. The lens barrel 110 is substantially a hollow cylinder. The second lens 114 is engagingly received in the lens barrel 110. The first lens 112 is coaxial to the second lens 114.

The image sensor module 12 includes a lens holder 120 and an image sensor 122. The lens barrel 110 is threaded in the lens holder 120. The image sensor 122 is received in the bottom portion of the lens holder 120 facing the lenses 112, 114. The image sensor 122 is a charge coupled device (CCD) or a complementary metal oxide semiconductor transistor (CMOS).

The driving module 14 includes a securing element 140, a plurality of shape memory alloy (SMA) units 142, a ceramic ring 144, a locator 146, and a plurality of resilient elements 148.

The securing element 140 is ring shaped, with the first lens 112 engagingly received therein. The outer diameter of the securing element 140 is smaller than the inner diameter of the lens barrel 110, such that the securing element 140 and the first lens 112 can slide in the lens barrel 110 along the axis thereof.

Each of the resilient elements 148 includes two ends. One end of a resilient element 148 is attached to the securing element 140, and the other end attached to the lens barrel 110. In the present embodiment, each of the resilient elements 148 is glued (i.e., adhesively mounted) to both the securing element 140 and the lens barrel 110. In alternative embodiments, the resilient element 148 can be integrally formed with the lens barrel 110 by insertion molding. The resilient elements 148 are evenly spaced from each other. The resilient elements 148 can be coiled or flat springs. In the present embodiment, the resilient elements 148 are three flat springs.

Each of the SMA units 142 includes a SMA wire 1420 and a metal wire 1422. One end of the SMA wire 1420 connects with one end of the metal wire 1422. The connecting point of the SMA wire 1420 and the metal wire 1422 is attached to the securing element 140 and spaced evenly from others.

The material of the SMA wire 1420 is Ti—Ni alloy; copper (Cu) based SMA, such as Cu—Zn—Al alloy, Cu—Zn—Ca alloy, Cu—Al—Ni alloy, Cu—Al—Be alloy, Cu—Al—Mu alloy, Cu—Zn—Si alloy, and Cu—Al—Te alloy; or iron (Fe) based SMA, such as Fe—Pt alloy, Fe—Pd alloy, Fe—Cr—Ni alloy, Fe—Ni—C alloy, Fe—Mn alloy, Fe-33Ni-10Co-4Ti alloy, Fe-32Mn-6Si alloy, Fe-28Mn-6Si-5Cr alloy, Fe—Cr—Ni—Co—Mn—Si alloy, or Fe—Cr—Ni—Mn—Si alloy. The diameter of the SMA wire 1420 is about 0.3 mm to about 1 mm.

The inner and outer diameters of the ceramic ring 144 are respectively similar to the inner and outer diameters of the lens barrel 110. The ceramic ring 144 is glued (i.e., adhesively mounted) to the top end of the lens barrel 110. The inner wall of the ceramic ring 144 defines a plurality of through holes 1440.

The locator 146 is annular. The outer wall of the locator 146 is glued to the inner wall of ceramic ring 142. The locator 146 locates the first lens 112 inside the lens barrel 110. The outer wall of the locator 146 defines a plurality of "L" shaped through holes 1460 corresponding to the through holes 1440. Each through hole 1440 is in communication with one end of each "L" shaped through hole 1460. The other end of each "L" shaped through hole 1460 is defined on the bottom surface of the locator 146. The SMA wire 1420 and the metal wire 1422 are inserted through the "L" shaped through hole 1460 and the through hole 1440, the SMA wire 1420 is attached to the lens holder 120 by gluing or welding, and the metal wire 1422 is connected with a heating device (not shown). In the present embodiment, the heating device is a circuit board configured for supplying a current to the metal wire 1422, such that the connected SMA wire 1420 can be heated.

The SMA wire 1420 has a preset shape that it resumes during heating, or in an environment with a high ambient temperature. In this embodiment, the SMA wire 1420 registers a straight shape which occurs at high temperature. In operation, the internal spaces between the first lens 112, the second lens 114, and the image sensor 122 can be adjusted by combination of the SMA units 142 and the resilient elements 148. The straight SMA wires 1420 are bent to be inserted through the corresponding "L" shaped through holes 1460 and the through holes 1440 and attached to the lens holder 120. When a current is supplied to the metal wires 1422, the metal wires 1422 transmit the heat generated thereby to the SMA wires 1420. When the heat generated by the current reaches or exceeds the point of Martensitic transformation, the SMA wires 1420 change from the bent shape to resume the straight shape, thus moving the first lens 112 towards the locator 146 correspondingly. When the heat generated by the current falls below the point of Martensitic transformation or the current is interrupted to the metal wires 1422, the resilient elements impel the first lens 112 towards the second lens 114. Thereby, the camera module 100 can perform autofocus or auto-zoom functions.

Figure 3:
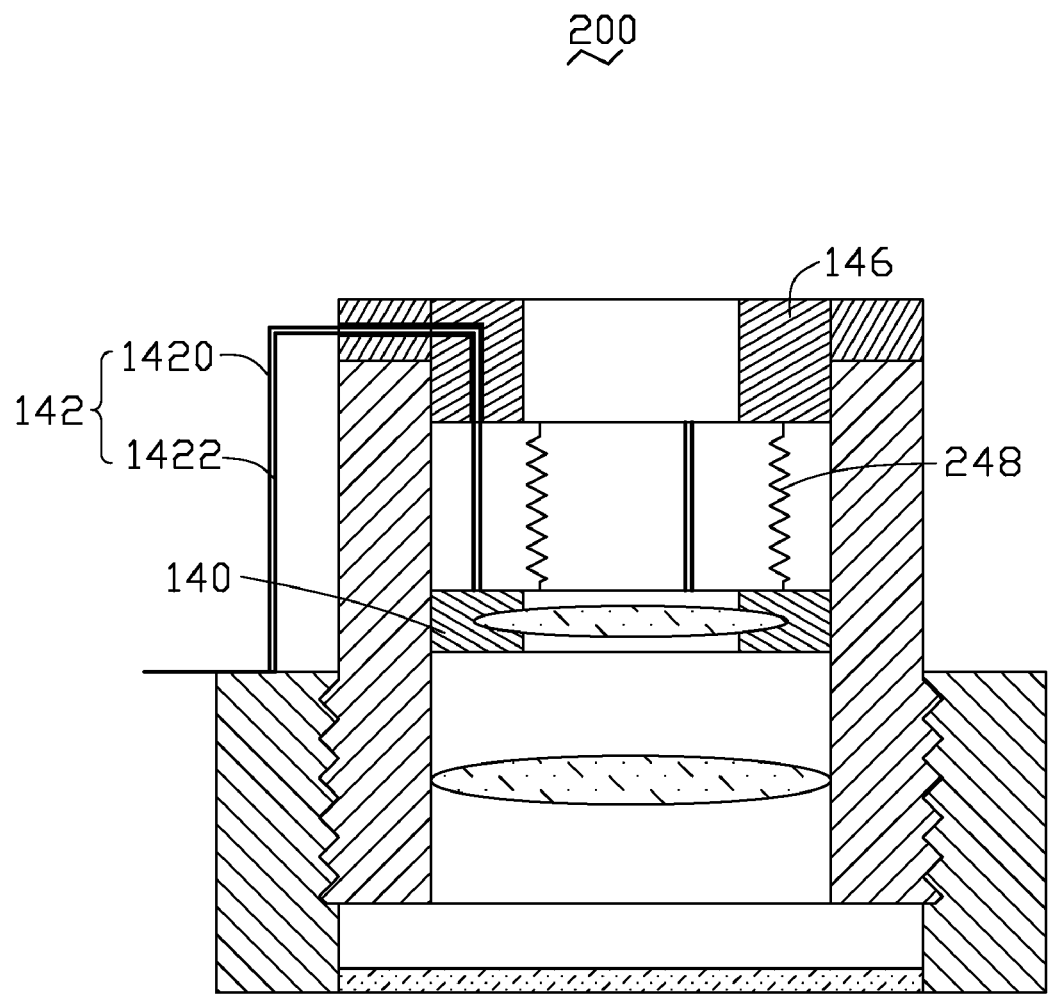
FIG. 3 is a cross-section of a camera module according to a second embodiment of the present invention.

Referring to FIG. 3, an exemplary camera module 200 according to a second embodiment is illustrated. The structure of the camera module 200 in the second embodiment is similar to that of the camera module 100 in the first embodiment, differing only in that the resilient elements 248 are three springs. One end of the elastic element 248 is attached to the securing elements 140, and the other to the locator 146. It is to be understood that the SMA unit 142 can be inserted through the springs of the elastic element 248.

Figure 4:
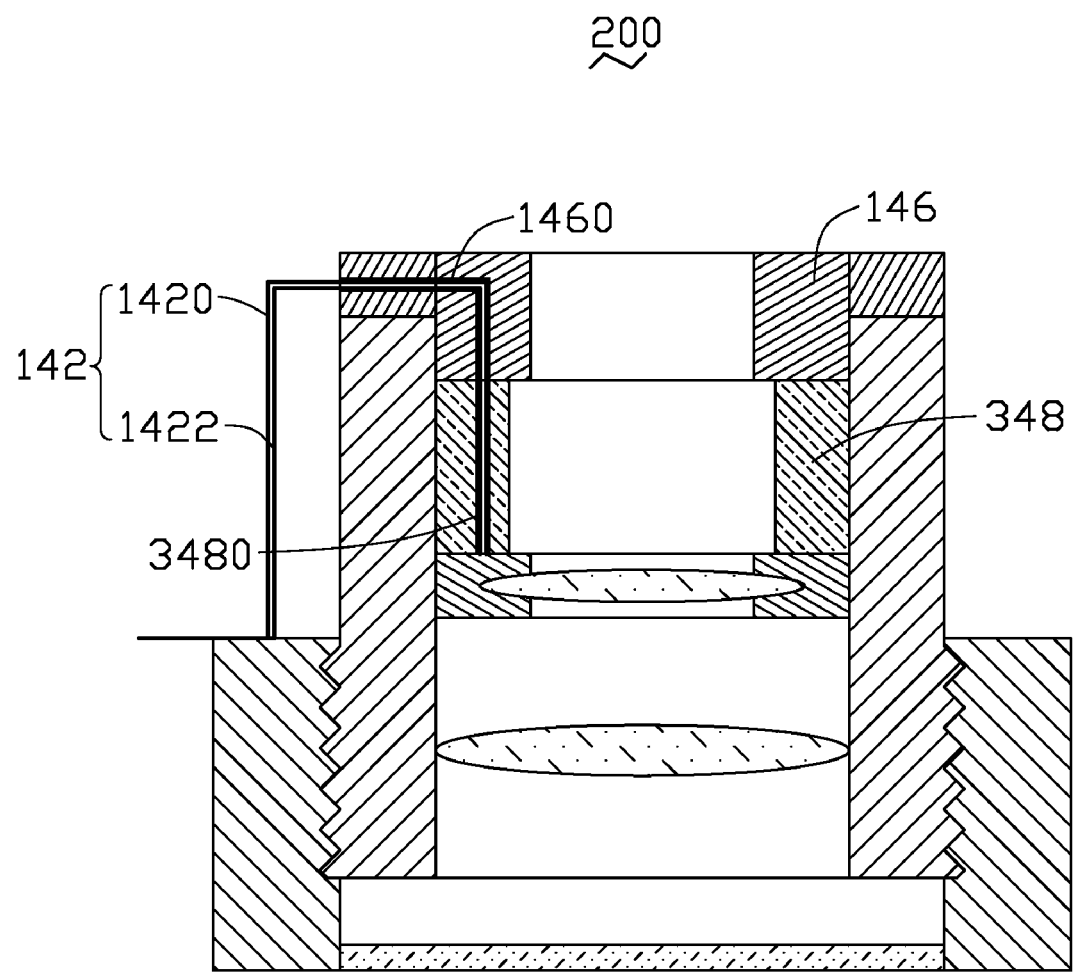
FIG. 4 is a cross-section of a camera module according to a third embodiment of the present invention.

Referring to FIG. 4, an exemplary camera module 300 according to a third embodiment is illustrated. The structure of the camera module 300 in the third embodiment is similar to that of the camera module 100 in the first embodiment, differing only in that the elastic element 348 is an elastic ring. One end of the elastic element 348 is attached to the securing elements 140, and the other to the locator 146. A plurality of through holes 3480 corresponding to the "L" shaped through holes 1460 are defined in the elastic element 348. The SMA unit 142 can be inserted into the "L" shaped through holes 1460 through the through holes 3480.

It is understood that the above-described embodiments are intended to illustrate rather than limit the invention. Variations may be made to the embodiments and methods without departing from the spirit of the invention. Accordingly, it is appropriate that the appended claims be construed broadly and in a manner consistent with the scope of the invention.

What is claimed is:

1. A camera module, comprising:
  a lens holder and an image sensor received in the lens holder;
  a lens barrel threaded in the lens holder;
  a lens received in the lens barrel and facing the image sensor;
  a plurality of shape memory alloy elements with a preset shape, each of the shape memory alloy elements comprising two ends, one end of the shape memory alloy element being received in the lens barrel and being attached to a periphery of the lens, and the other end being attached to the lens holder, the shape memory alloy elements being respectively configured for selectably moving the lens away from the image sensor; and
  a plurality of resilient elements received in the lens barrel and connected with the periphery of lens and the lens barrel, the resilient elements being configured for moving the lens toward the image sensor.

2. The camera module as described in claim 1, wherein the resilient elements are selected from the group consisting of springs, flat springs, and elastic rings.

3. The camera module as described in claim 1, wherein each shape memory element comprises a shape memory wire and a metal wire, one end of the shape memory wire connecting with one end of the metal wire, the connecting point of the shape memory wire and the metal wire attached to the periphery of the lens, and the shape of the shape memory alloy wire being changeable by applying a current to the metal wire.

4. The camera module as described in claim 3, wherein a material of the shape memory wire is selected from the group consisting of Ti—Ni alloy, copper based shape memory alloy, and iron based shape memory alloy.

5. The camera module as described in claim 3, wherein a diameter of the shape memory wire is in a range from 0.3 mm to 1 mm.

6. A camera module, comprising:
  a lens holder;
  a lens barrel having an axis and threaded in the lens holder;
  a lens received in the lens barrel;
  a plurality of shape memory alloy elements with a preset shape, each of the shape memory alloy elements comprising two ends, one end of the shape memory alloy element being attached to a periphery of the lens, and the other end being attached to the lens holder; and
  a plurality of resilient elements connected with the periphery of lens and the lens barrel, the shape memory alloy elements and the resilient elements cooperatively moving the lens relative to the lens holder; and
  a ceramic ring mounted on one end of the lens barrel away from the lens holder, the ceramic ring having a plurality of first through holes defined therein for the shape memory alloy elements to be inserted therethrough.

7. The camera module as described in claim 6, further comprising an annular locator adhesively mounted on an inner wall of the ceramic ring, the locator having a plurality of second through holes defined therein, in communication with the respective first through holes, each of the shape memory alloy elements being inserted through the respective second through holes.

8. The camera module of claim 7, wherein the second through holes each are "L" shaped with one end thereof in communication with the respective first through holes and the other end thereof in communication with an interior space of the lens barrel, the two ends of each second through hole being perpendicular with one another.

9. The camera module of claim 6, wherein each shape memory element comprises a shape memory wire and a metal wire, one end of the shape memory wire connecting with one end of the metal wire, with the connecting point of the shape memory wire and the metal wire attached to the periphery of the lens, whereby the shape of the shape memory alloy wire is changeable by applying a current to the metal wire.

10. The camera module of claim 9, wherein the connecting points of the shape memory wires and the metal wires are spaced evenly from each other around the axis of the lens barrel.

11. The camera module of claim 6, wherein the resilient elements are evenly spaced from each other around the axis of the lens barrel.

12. The camera module of claim 6, wherein the resilient elements are selected from the group consisting of springs, flat springs, and elastic rings.

13. The camera module of claim 6, wherein the shape memory element comprises a shape memory wire and a metal wire, one end of the shape memory wire connecting with one end of the metal wire, the connecting point of the shape memory wire and the metal wire attached to the periphery of the lens, and the shape of the shape memory alloy wire is changeable by applying a current to the metal wire.

14. A camera module, comprising:
a lens holder;
a lens barrel having an axis and threaded in the lens holder;
an annular securing element received in the lens barrel;
a lens engagingly received in the securing element, the securing element and the lens being slidably arranged in the lens barrel along the axis thereof;
a plurality of shape memory alloy elements each with a preset shape, each of the shape memory alloy elements comprising two ends, with one end thereof received in the lens barrel and attached to the securing element, and the other end thereof attached to the lens holder; and
a plurality of resilient elements received in the lens barrel and connecting the lens with the lens barrel, the shape memory alloy elements and the resilient elements cooperatively moving the securing element relative to the lens holder.

15. The camera module as described in claim 14, wherein the resilient elements are selected from the group consisting of springs, flat springs, and elastic rings.

16. The camera module as described in claim 14, wherein each shape memory element comprises a shape memory wire and a metal wire, one end of the shape memory wire connecting with one end of the metal wire, with the connecting point of the shape memory wire and the metal wire attached to the securing element, whereby the shape of the shape memory alloy wire changeable by applying a current to the metal wire.

17. The camera module as described in claim 16, wherein a material of the shape memory wire is selected from the group consisting of Ti—Ni alloy, copper based shape memory alloy, and iron based shape memory alloy.

18. The camera module as described in claim 16, wherein a diameter of the shape memory wire is in a range from 0.3 mm to 1 mm.

19. The camera module as described in claim 14, further comprising a ceramic ring mounted on one end of the lens barrel away from the lens holder, the ceramic ring having a plurality of first through holes defined therein for the shape memory alloy elements to be inserted therethrough.

20. The camera module as described in claim 19, further comprising an annular locator adhered on an inner wall of the ceramic ring, the locator having a plurality of second through holes defined therein, the plurality of second through holes being in communication with the respective first through holes, and each of the shape memory alloy elements being inserted through the respective second through holes.

* * * * *